Sept. 16, 1952      A. LEMOS, JR      2,610,822
VALVE FOR PRESSURE CONTROL SYSTEMS
Original Filed June 2, 1947
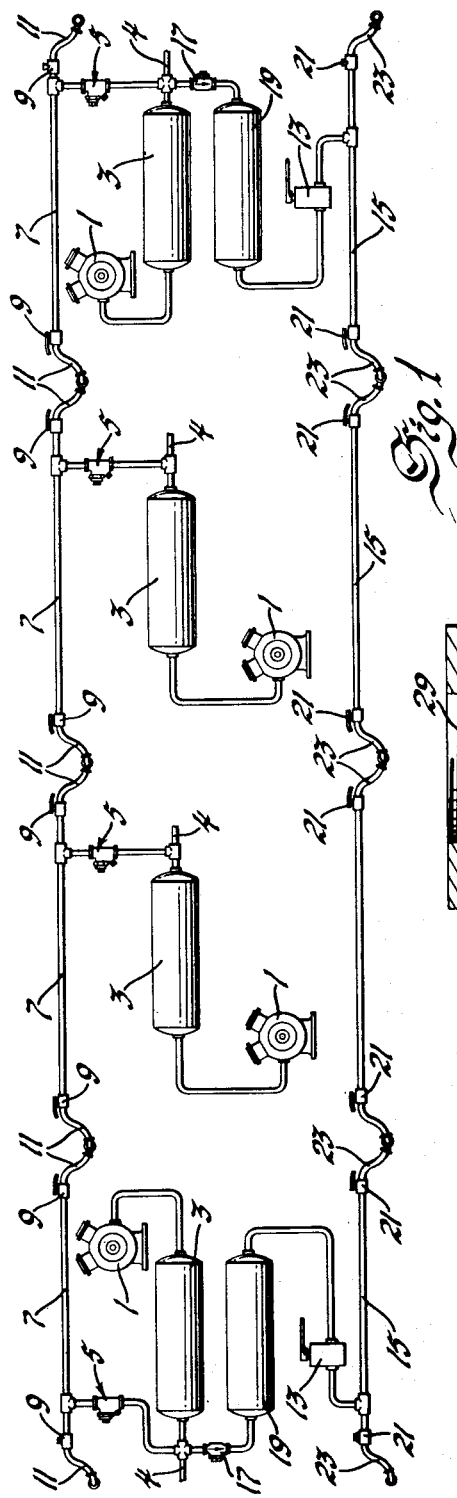
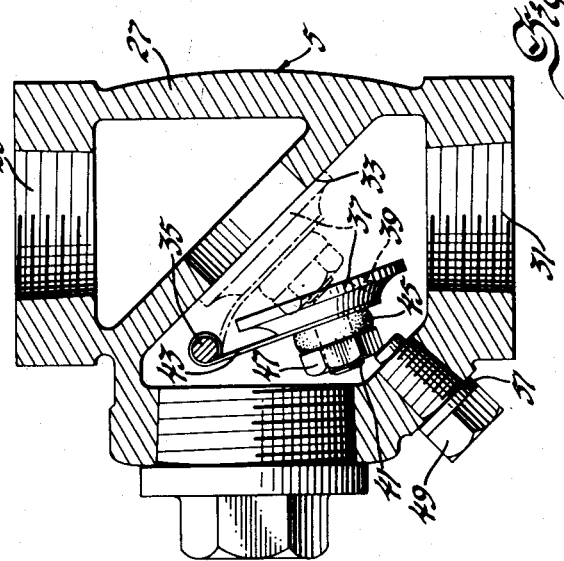
Inventor
Albert Lemos, Jr.
By
Spencer, Willets, Helmig & Baillio
Attorneys Patented Sept. 16, 1952

2,610,822

UNITED STATES PATENT OFFICE 2,610,822

VALVE FOR PRESSURE CONTROL SYSTEMS

Albert Lemos, Jr., Hinsdale, Ill., assignor to General Motors Corporation, Detroit, Mich., a corporation of Delaware Continuation of application Serial No. 751,661, June 2, 1947. This application June 14, 1951, Serial No. 231,547

3 Claims. (Cl. 251—120)

This invention generally relates to pressure control systems and more particularly to protective valve means in such systems to provide safe operation thereof. This application is a continuation of my copending application Serial No. 751,661, filed June 2, 1947, now abandoned.

The principal object of the invention is to provide in a pressure control system simple protective valve means acting automatically to cut off abnormal pressure flow due to excessive leakage therefrom, said protective valve means being automatically restored to a normally open protective position when normal conditions are restored in the system.

Another object is to provide valve means in a pressure control system whereby other similar systems may be connected and safely controlled in multiple therewith or individually in case of accidental disconnection and to provide prompt pressure equalization between the connected systems.

The means by which the above objects are obtained will become apparent by reference to the following description and drawing showing one form of my protective valve means included in an air brake and control system for which this valve means is particularly adapted for locomotive units which are controlled and operated singly or in multiple coupled relation.

Figure 1 is a schematic view of a plurality of locomotive unit air brake and power control systems coupled together, each system including individual protective valve means.

Figure 2 is an enlarged vertical cross sectional elevational view of one of the protective valve means shown in Figure 1.

As best illustrated in Figure 1 each of the air brake and control systems for each of four locomotive units includes an air compressor 1 shown connected by means of a pipe connection to one end of a main pressure reservoir 3. Three pipe connections are shown leading from the other end of each of the reservoirs 3. The pipe connection 4 leads to air pressure operated power plant control mechanism of the locomotive unit, not shown, which mechanism is controlled through suitable interconnected train line control connections to a manually operable master controller, not shown, for controlling the speed, load and output coupled locomotive units in multiple or individually in conventional manner.

Another branch pipe connection from the reservoir 3 is shown including protective valve means, generally indicated at 5, and connected to a reservoir equalizing pipe 7 provided with angle shutoff cocks 9, and air hoses 11 at the ends thereof.

The angle cocks 9 at the adjacent ends of the equalizing pipes 7 are opened after the hoses 11 are coupled, as shown, and the angle cocks 9 at the remote ends of the coupled systems are shown closed.

An engineer's valve 13 is shown in the air brake and control systems of the end locomotive units serving as the control units and provided with conventional master controllers, not shown, for the power plant control apparatus. The engineer's valve 13 is shown in a third branch pipe connection leading from the air reservoir 3, which connection is shown connected to a brake pipe 15 and also includes a check valve 17 and an auxiliary air pressure reservoir 19. The check valve 17 permits one-way flow of air pressure from the main reservoir 3 to the auxiliary reservoir 19. The ends of brake pipes 15 of the locomotive units are shown provided with angle shut-off cocks 21 and hoses 23 shown coupling the adjacent ends of the brake pipes. The intermediate units not provided with master controllers and engineer's valves serve as booster units. Each locomotive unit is provided with automatic air brake equipment of conventional type and all but the end angle cocks 21 in the brake pipes 15 are shown in the open position with the hoses 23 at the adjacent ends coupled. The angle cocks 21 at the remote ends of the brake pipes are closed until one end of the coupled locomotive brake pipes 15 are coupled by means of a hose 23 to the train brake pipes, not shown, after which the adjacent cock 23 is opened so that the brakes of the coupled locomotives and train may be applied and released by operation of either engineer's valves 13 and automatically applied upon parting of the brake pipe hoses 15 in conventional manner.

As best illustrated in Figure 2, each protective valve means 5 comprises a hollow valve body 27 having upper and lower threaded openings 29—31. The lower threaded opening 31 is connected to the main reservoir 3 and the upper threaded opening 29 is connected to the main reservoir equalizing pipe 7. A valve seat 33 inclined to the vertical axis is provided in the body between the openings 29—31. A horizontal pivot pin 35 is secured in the body directly below the upper portion of the inclined valve seat 33 and a valve head 37 having a small equalizing passage 39 extending therethrough and a central stud 41 is shown extending through an opening in the lower end of a leaf supporting spring 43 by means of a washer 45 and nut 47 on the outer end of the stud 41. The upper end of the leaf spring 43 is loosely wrapped around the pivot pin 35 so that the valve head 37 and spring 43 is pivotally suspended on the pivot pin 35 and the nut 47 normally rests on the inner end of a positioning stud 49 threaded in the valve body 27. A washer 51 of proper thickness is placed under the head of the stud 49 to position the valve head 37 and spring 43 so that normal flow of equalizing air pressure in either direction past the head causes no movement thereof but upon abnormal flow of equalizing air pressure upwardly past the head from the reservoir 3 to the reservoir equalizing pipe 7 the head and spring are swung upwardly into seating relation with the seat 33 to cut off abnormal flow and allow only a restricted flow through the small equalizing passage 39 in the head 37. It will be noted that when the valve head 37 is seated the pressure on the lower face causes the spring 43 to be bent, as shown in dotted lines in Figure 2, so that upon a given difference in pressure on opposite faces of the head it will be moved off the seat by the spring 43 and fall by gravity to the full line position shown in Figure 2.

With each air brake and control system provided with protective valve means 5 and connected as described above it will be evident that two-way normal flow of equalizing air pressure through the coupled equalizing pipes 7, protective valve means 5 and reservoirs 3 is permitted as the valve heads 37 of the protective means 5 are gravity retained in the normal unseated position. Should, however, an equalizing pipe 7 or connecting hose 11 break or should the hoses 11 become uncoupled abnormal leakage of air pressure will occur and the resulting rush of air upwardly through each of the protective means 5 will cause seating of the heads 37 on the seats 33 to then allow escape of only a restricted amount of air through the equalizing passages 39 in the heads 37 from the reservoirs 3. The compressors 1 are capable of maintaining normal operating pressure in the reservoir 3 over and above the amount escaping through the valve head equalizing passage 39 thereby providing normal manual control of the power and air brake equipment of the coupled locomotives. Should the locomotive brake pipes 15 or those of the cars hauled thereby become uncoupled the brakes on the locomotives and cars will be automatically applied in conventional manner and if one or more lead locomotive units break away from the following units of the train the protective means provides normal manual control of the power and brake equipment of the disconnected leading units so that the brakes may be released and the power and speed increased to prevent these units from being overtaken by the train.

It will likewise be evident upon repair of the break in the equalizing pipe 7 or shutoff of pressure escaping through the normally open angle cocks 11 either side of the uncoupled hoses 11 that pressure equalization through the equalizing passages 39 in the seated valve heads 37 will take place. Upon equalization of pressure of opposite faces of the valve heads to a value where the bent valve head supporting springs 43 overcomes the preselected pressure difference on the opposite faces the heads 37 will be urged off the seats by the then bent supporting springs 43 and the heads will then be automatically returned by gravity to the normal open position and rest on the positioning studs 49.

With the valve head 37 secured to a leaf spring 43 in the above described manner and the spring bent upon full seating engagement of the valve, restricted flow through the equalizing passage 39 in the valve head takes place from a fully charged reservoir 3 on one locomotive unit to an empty reservoir 3 on another locomotive unit by way of the equalizing pipes 7 and hose connections 11 interconnecting these locomotive units. When the pressure differential on opposite sides of the valve decreases to a value at which the bent spring 43 cracks the valve head off the seat 35 and the head is in engagement with only a portion of the seat a more rapid flow of equalizing air takes place past the valve head from the fully charged reservoir to the reservoir being charged and the pressure will promptly rise to substantially the same value as that in the fully charged reservoir. This causes the rate of flow past the valve head to decrease and the valve head and spring will then be automatically returned by gravity to the normal open position to provide unrestricted two-way normal flow between the reservoirs. The protective valve means 5 accordingly provides two rates of restricted one-way equalizing air flow and unrestricted two-way flow of equalizing air therethrough.

Similar operation of the protective valve means 5 on a single locomotive unit will take place upon breakage of the equalizing pipe 7 or inadvertent opening of an angle shutoff cock 9 followed by repair of the break or closure of the cock.

I claim:

1. An equalizer valve for fluid brake systems of multi-unit locomotives comprising, a valve body having a through passage including an annular seat, a pivot at one side of said seat adjacent one edge thereof, a flat spring member swingably mounted on said pivot and forming a valve head support, a valve head having a restricted passage therethrough and so secured to said member as to be capable of a two-step seating operation in response to fluid pressure in the first of which the head swings about said pivot to angularly engage said seat to restrict the flow through said passage and in the second of which said spring member flexes to permit full seating of the head on said seat to confine the flow to said restricted passage in said head, and adjustable means for positioning said head in predetermined gravity-biased position away from said seat to vary the response pressure thereof.

2. An equalizer valve for fluid brake systems of multi-unit locomotives comprising a valve body having a through passageway including an annular seat inclined to the axis of said passageway, a pivot in said body located in a plane parallel to one side of said seat and adjacent one edge of said seat, a leaf spring support swingably mounted on said pivot and a valve head having a restricted passage extending therethrough and secured to said leaf spring to one side of said pivot for movement by fluid flow through said passageway into angular contact with said seat to restrict fluid flow and to bend said spring to then cause full seating engagement of said head on said seat to further restrict fluid flow by the passage in said head.

3. An equalizer valve for fluid brake systems of multi-unit locomotives comprising a valve body having a through passageway formed therein and including an annular valve seat extending across said passageway, a pivotal support in said body and located adjacent one edge of said seat, a spring mounted on said support and having a valve head rigidly secured thereto, said spring and valve being movable by gravity about said support to swing said valve to open position in said body, said support being positioned with respect to said annular seat to prevent complete closing of said valve upon said seat and in response to the flow of fluid in said passageway without bending said spring, and a restricted passageway extending through said valve, said restricted passageway being adapted to permit the flow of fluid through said valve when said valve is completely closed upon said seat, said spring when bent by the closing of said valve upon said seat being energized to tilt said valve with respect to said seat to permit the further opening of said valve by gravity, when the flow of fluid through said restricted passageway falls below a predetermined value.

ALBERT LEMOS, Jr.

No references cited.